United States Patent [19]
McLeister

[11] Patent Number: 5,798,941
[45] Date of Patent: Aug. 25, 1998

[54] SURGE PREVENTION CONTROL SYSTEM FOR DYNAMIC COMPRESSORS

[75] Inventor: Larry D. McLeister, Fort Collins, Colo.

[73] Assignee: Woodward Governor Company, Loveland, Colo.

[21] Appl. No.: 802,781

[22] Filed: Feb. 18, 1997

Related U.S. Application Data

[63] Continuation of Ser. No. 582,083, Jan. 2, 1996, abandoned.
[51] Int. Cl.⁶ ................................................. G05D 16/00
[52] U.S. Cl. ................ 364/510; 364/141; 364/153; 364/162; 701/100; 415/1; 415/26; 417/300; 417/301; 417/307
[58] Field of Search ....................... 364/510, 509, 364/431.02, 141, 142, 152–155, 162, 551.9; 415/28, 27, 1, 11, 17, 49, 50, 26, 15; 417/292, 300, 301, 307, 309, 20, 26, 28, 47, 53; 701/100

[56] References Cited

U.S. PATENT DOCUMENTS

| | | |
|---|---|---|
| 4,142,838 | 3/1979 | Staroselsky ............... 417/20 |
| 4,156,578 | 5/1979 | Agar et al. ................ 415/1 |
| 4,486,142 | 12/1984 | Staroselsky ............... 415/1 |
| 4,697,980 | 10/1987 | Keyes, IV et al. ........ 415/1 |
| 4,831,534 | 5/1989 | Blotenberg ............ 364/431.02 |
| 4,944,652 | 7/1990 | Blotenberg ............ 415/27 |
| 4,949,276 | 8/1990 | Staroselsky et al. ...... 364/509 |
| 4,971,516 | 11/1990 | Lawless et al. .......... 415/1 |
| 5,242,263 | 9/1993 | Mondoloni ............. 415/1 |
| 5,306,116 | 4/1994 | Gunn et al. ........... 364/431.02 |
| 5,347,467 | 9/1994 | Staroselsky et al. ..... 364/510 |
| 5,508,943 | 4/1996 | Batson et al. ........ 364/431.02 |

OTHER PUBLICATIONS

Pp. 364–370 of Manual 80010 entitled "Programming Manual Oriented Editor". Prepared by Woodward Governor Co. for internal use. (No date).

Pp. 3&4 from the Steward & Stevenson Standard Control Manual for GE LM2500 turbine engine. prepared by Woodward Governor Co. (No date).

Pp. 1, 13–16 and 18 of "Compressor Antisurge Control" manual of Tri–Sen Co., Sep. 1993.

Excerpts from "Anti–Surge Control" manual of Dresser––Rand Control Systems. (No date).

"How to Cope with the High Speed of Approaching Surge", p. 7, Turbomachinery Maintenance, Jul. 1988.

"Basic TurboCompressor Control and Protection", 36 Turbomachinery International, Jul./Aug. 1995.

"Benefits of the Series 3 Control System" from Series 3 Antisurge Controller Manual No. IM31 of Woodward Governor Co. (No date).

"Compressor Surge Prevention" by Larry McLeister in Turbomachinery Control Conference 1995. (No date with month).

Primary Examiner—Emanuel Todd Voeltz
Assistant Examiner—Hal D. Wachsman
Attorney, Agent, or Firm—Leydig, Voit & Mayer, Ltd.

[57] ABSTRACT

A surge prevention control system for use with a dynamic compressor provides a multiple module controller for operating an anti-surge valve to bypass flow around the dynamic compressor. The multiple module controller includes a PID control module and a rate control module. The PID control module controls the anti-surge valve to control the operating point of the dynamic compressor about the surge control line. The rate control module uses the rate of approach of the operating point to the surge control line as its process variable. In the event of high rate of approach, the rate control module takes control of the anti-surge valve. The setpoint of the rate control module is adjusted to open the anti-surge valve to control the rate of approach to the surge control line to minimize the overshoot of the PID control.

27 Claims, 6 Drawing Sheets

1

SURGE PREVENTION CONTROL SYSTEM FOR DYNAMIC COMPRESSORS

This is a continuation of application Ser. No. 08/582,083 filed on Jan. 2, 1996, now abandoned.

FIELD OF THE INVENTION

The present invention generally relates to control systems for controlling the operation of dynamic compressors, and more particularly to control systems and methods for preventing surge in dynamic compressors.

BACKGROUND OF THE INVENTION

Dynamic compressors are widely used in industrial processes for providing a source of compressed gas. In order to avoid interrupting the operation of a downstream process which receives the compressed gas, the operation of a dynamic compressor has to be well controlled to provide stable output pressure or flow rate as required by the downstream process. It is well known, however, that if the flow rate of a dynamic compressor drops below a certain threshold level for reasons such as changed conditions of the downstream process, surge and complete flow collapse can occur in the compressor. Besides causing the inevitable consequence of interrupting the downstream process, surge can also be a catastrophic experience for the dynamic compressor, causing audible noise and strong vibrations in the compressor which in serious cases can severely damage the dynamic compressor.

The threshold flow rate below which the dynamic compressor will experience surge is a function of the differential pressure across the dynamic compressor. The surge condition is often described using a compressor map that represents the operation of the compressor in terms of actual flow versus polytropic head. It has been found that surge will occur if the operating point of a compressor wheel in the compressor map falls within a surge zone bordered by a surge line which is well approximated by a parabolic curve defined as:

$$(\text{actual flow})^2/(\text{polytropic head}) = K,$$

where K is a constant.

The commonly employed way to prevent a dynamic compressor from surging, or to bring the compressor out of surge, is to open an anti-surge valve connected to the compressor output to return a portion of the output flow of the dynamic compressor to the compressor inlet. In this way, the flow rate of compressor is increased so that the operating point of the compressor is moved away from the surge region. In order to control the operating point to prevent it from moving into the surge region, systems have been developed using proportional-integral-derivative (PID) controllers to control the opening and closing of the anti-surge valve. Those controllers normally operate after the operating point of the compressor passes a predefined surge control line which is disposed in the compressor map within a chosen safety margin from the surge line.

For purposes of effectively preventing surge from occurring, it is highly advantageous to be able to anticipate the need for opening the anti-surge valve by assessing whether a flow disturbance is likely to cause the operating point of the compressor to move across the surge line. A good indicator of the likelihood of surge is the rate at which the operating point approaches the surge line, i.e., the time derivative of the distance between the operating point and the surge limit line. If a surge control system can properly respond to a high rate of approach by opening the anti-surge valve before the operating point reaches the surge control line, the risk of surge can be significantly reduced.

Due to considerations of stability, PID controllers commonly used for surge control are not suitable for the task of responding to the rate of approach despite of their "derivative" actions. In most anti-surge control applications, the process variable to a PID controller is a calculated value based on the measured gas flow. The gas flow rate as measured is inherently noisy and has low signal-to-noise ratio. If the derivative function of a PID is used to respond to the rate of approach, it would open and close the anti-surge valve in response to noise causing undesirable interference with the control of the process and needless waste of energy. For this reason, the derivative action of the PID cannot be relied upon to respond to the rate of approach.

A method for responding to the rate of approach of the operating point to the surge line is disclosed in U.S. Pat. No. 4,949,276 to Staroselsky et al. That method involves moving the setpoint of a PID controller for controlling an anti-surge valve away from the surge line so that the process value of the PID controller would cross the setpoint sooner. As a result, the PID controller will act sooner to open the anti-surge valve than it would act otherwise. According to this reference, the amount by which the setpoint is moved is a function of the rate of approach of the operating point to the surge limit. Such a method has several disadvantages. For example, having a continuously changing setpoint makes it difficult to monitor the operation of the PID controller. Moreover, because that method creates an ever changing artificial error for the PID controller to respond to, the operation of the PID controller is less predictable. Furthermore, because of the requirements for smooth and stable operation, a normal PID controller for controlling the opening of the anti-surge valve is not optimized to respond to sharp flow disturbances, and therefore does not provide optimal response for reacting to the rate of approach of the operating point to the surge limit line and hence is difficult to set up for effective surge control.

SUMMARY OF THE INVENTION

In view of the foregoing, it is a general object of the present invention to provide an improved control system for use with a dynamic compressor that effectively prevents the compressor from surging.

To that end, it is an object of the present invention to provide a surge prevention control system for a dynamic compressor that controls the position of the operating point of the compressor about a surge control line and at the same time is optimized to respond to high rate of approach of the operating point to the surge line.

It is a related object of the present invention to provide a surge prevention control system for a dynamic compressor that provides optimized PID control over the position of the operating point of the dynamic compressor about a surge control line, and also provides optimized response to high rate of approach of the operating point to the surge line that does not adversely impact operation of the PID control.

In accordance with those and other objects of the invention, there is provided a control system for preventing surge in a dynamic compressor and employing a multiple module control optimized for both position and rate control of the compressor operating point. The compressor has a variable operating point definable in a compressor map which includes a stable region, a surge region, a surge line separating the two regions and a surge control line near but displaced from the surge line. The control system operates an anti-surge valve which has an electrical input for adjusting the valve opening to controllably increase the flow through the dynamic compressor. The control system utilizes a multiple module controller which has an input for receiving a control variable indicative of the operating point of the dynamic compressor, and has an output signal for controlling the valve opening of the anti-surge valve. A PID control module in the multiple module controller receives the control variable as a process input and has a setpoint corresponding to the surge control line to produce a first output signal exerting control action on the operating point of the dynamic compressor in the region of the surge control line. A derivative module in the multiple module controller receives the control variable and produces a rate signal having a magnitude indicative of the rate of approach of the operating point to the surge control line. A rate control module in the multiple module controller receives the rate signal as a process input and produces a second output signal when the rate of approach exceeds a setpoint to begin a corrective opening of the anti-surge valve. An output signal selector receives a plurality of input signals including the first and second output signals and selects one of the input signals as the output signal of the multiple module controller.

It is a feature of the present invention to use a closed loop PID control module to control the position of the operating point of the compressor in the region of a surge control line, and to use a rate control module to directly control the rate of approach of the operating point. The rate control module takes over control of the anti-surge valve and starts to open the anti-surge valve when the rate of approach becomes excessively high, even before the PID control module becomes active.

It is a feature of the present invention that the rate control module is provided with an integrator function which allows the rate controller to reduce the error to zero.

It is another feature of the present invention that the setpoint of the rate control module is adjusted according to the proximity of the operating point to the surge control line so as to avoid unnecessary opening of the anti-surge valve.

It is yet another feature of the present invention that the gain of the rate control module is adjusted according to the operating conditions of the dynamic compressor to linearize the action of the rate control module.

Other objects and advantages will become apparent from the following detailed description when taken in conjunction with the drawings, in which:

DETAILED DESCRIPTION OF THE INVENTION

Figure 1:
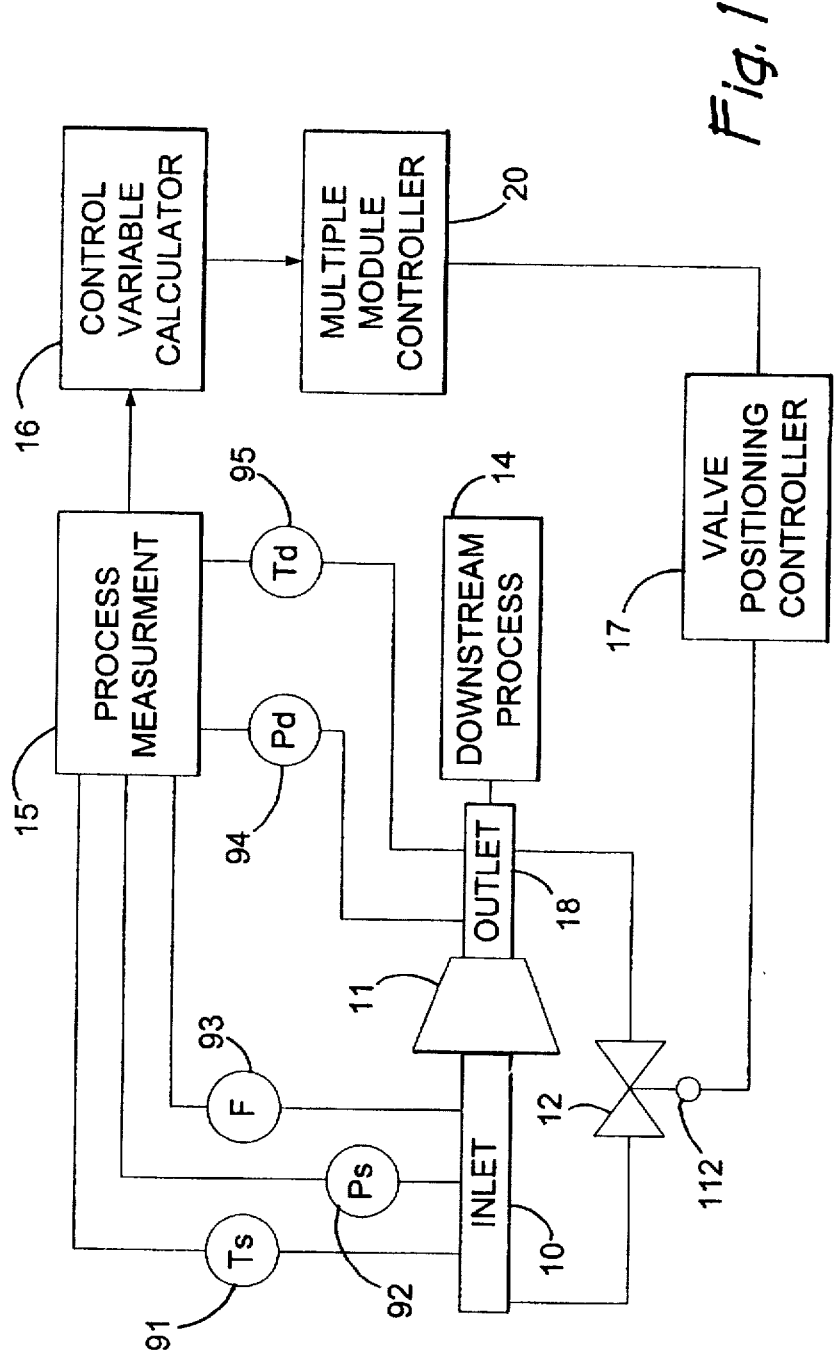
FIG. 1 is a schematic diagram showing a dynamic compressor with an anti-surge valve controlled by a multiple module controller exemplifying the practice of the present invention.

Turning now to the drawings, FIG. 1 is a schematic diagram showing a dynamic compressor 11 with a surge prevention control system. The surge prevention control involves adjusting an anti-surge valve 12 which is connected to the output of the dynamic compressor 11. In the system shown in FIG. 1, the anti-surge valve 12 is also connected to the inlet 10 of the dynamic compressor 11. The anti-surge valve 12 has an adjustable opening which is controlled by an electrical signal sent to a control input 112 of the anti-surge valve 12. When the anti-surge valve 12 is opened, a portion of output flow of the dynamic compressor 11 is bypassed around the compressor 11 and returned to its inlet 10 so the flow bypassed through the anti-surge valve 12 is recycled. Bypassing flow around the dynamic compressor 11 increases the total flow through the dynamic compressor 11, which has the effect of moving the operating point away from the surge region. It will be appreciated that instead of recycling the gas as illustrated in FIG. 1, the flow of the dynamic compressor 11 can also be increased by simply dumping a portion of the output flow of the dynamic compressor 11 via the anti-surge valve 12. When the term "bypass" is used herein, unless the context indicates otherwise, it is intended to encompass both the preferred form of recycling, as well as the less preferred form of dumping.

To effectively prevent surge in the compressor 11 while at the same time minimizing interference with the downstream process 14 which receives the compressed gas, the opening and closing of the anti-surge valve 12 should be carefully controlled. As shown in FIG. 1, the valve opening is controlled by a multiple module controller 20. In accordance with the teaching of the present invention, the multiple module controller 20 not only operates the anti-surge valve 12 to control the operating point of the compressor 11 when the operating point is close to the surge line, but also operates the anti-surge valve 12 to directly control the rate of approach of the operating point to the surge line when such rate of approach is high. In other words, the multiple module controller 20 anticipates the likelihood of surge by monitoring the rate of approach and takes corrective action by opening the anti-surge valve 12 to control the rate of approach in the event that the operating point moves rapidly toward the surge line.

In more detail, the dynamic compressor 11 has a gas inlet schematically shown at 10, and operates to compress the gas and supply the compressed gas via an output 18 to a downstream process 14. A plurality of sensors are disposed in the inlet 11 and outlet 18 as is conventional, and are adapted to monitor the operating conditions of the compressor. As illustrated in FIG. 1, the sensors typically include an inlet temperature sensor 91, an inlet pressure sensor 92, a flow sensor 93, a discharge pressure sensor 94, a discharge temperature sensor 95. Other types of sensors can also be used. The output signals of the sensors are sent to a process measurement module 15 which processes the sensor output signals to determine the operating conditions of the compressor 11. The output of the process measurement module 15 is used by a control variable calculator 16, which calculates a control variable according to the measured operating conditions. The control variable is then used by the multiple module controller 20 to generate an output control signal, which is used by the valve positioning controller 17 to control the valve opening of the anti-surge valve 12.

Figure 2:
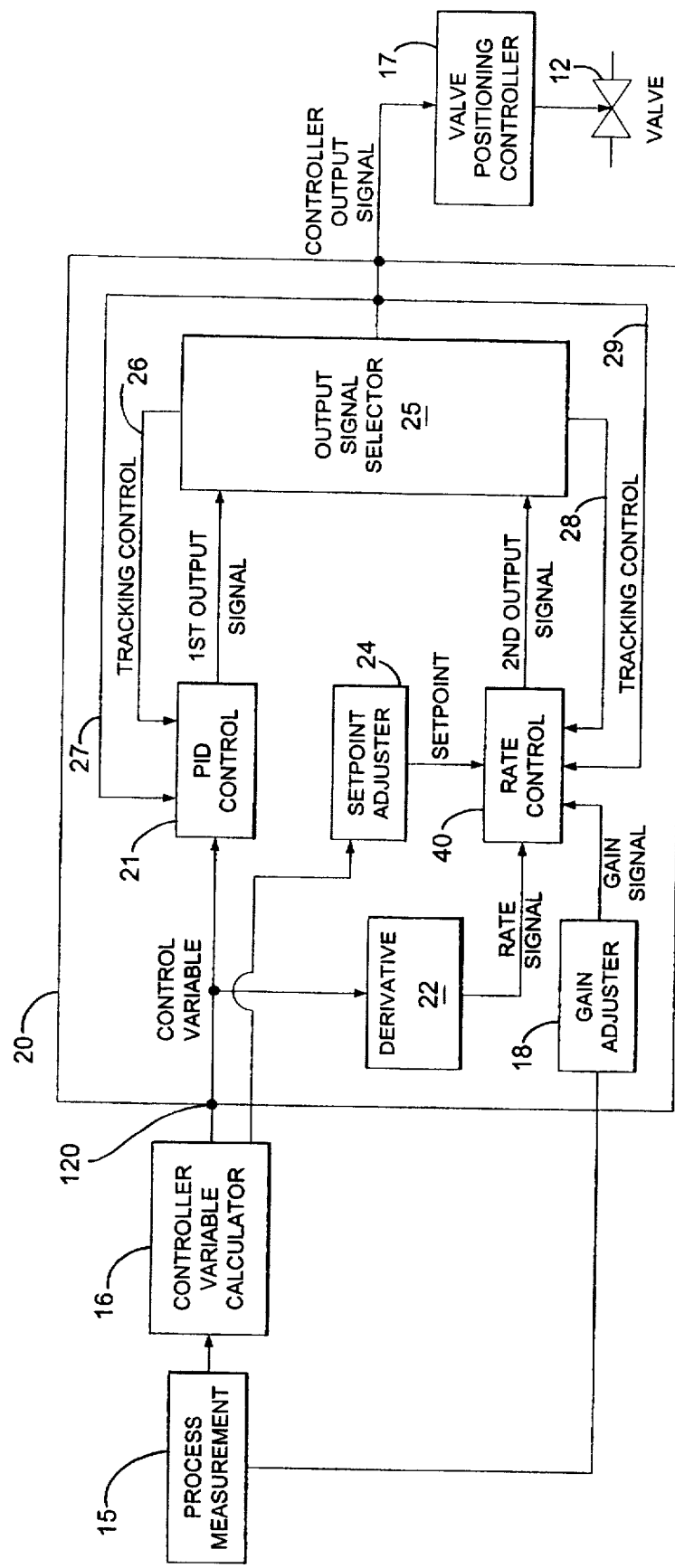
FIG. 2 is a schematic diagram showing the multiple module controller for surge prevention having a PID control module and a rate control module.

A more detailed view of the multiple module controller 20 is shown in FIG. 2. The multiple module controller 20 comprises a PID control module 21 and a rate control module 40, both of which operate to control the valve opening of the anti-surge valve 12 to prevent surge in the compressor 11 (FIG. 1). The PID control module 21 is optimized for controlling the position of the operating point of the dynamic compressor 11 between a predefined surge control line and the surge line so as to resist movement of the operating point into the surge region.

Figure 5:
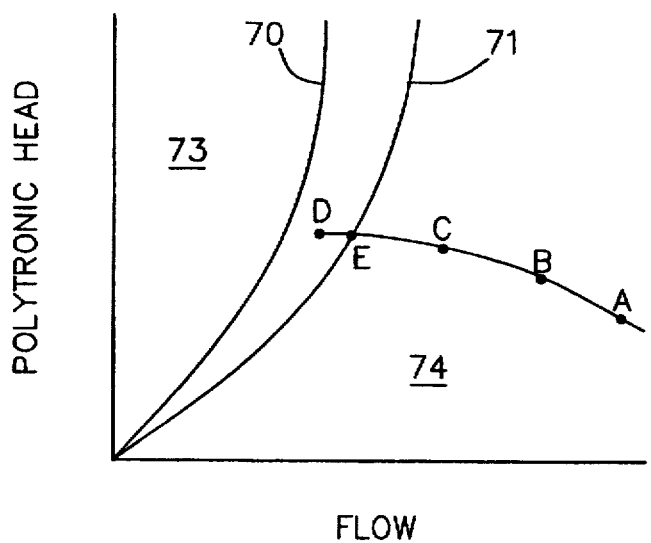
FIG. 5 is a compressor map for a dynamic compressor, and illustrates different positions of the operating point of the compressor.

Digressing briefly to FIG. 5, there is shown a compressor map in which a surge line 70 divides an unstable operating region 73 (the surge region) to the left of the surge line from a stable operating region 74 to the right of the surge line 73. A surge control line 71 defines an operating region between the surge line 70 and surge control line 71 where the PID control module 21 is primarily tuned to control the anti-surge valve.

In practicing the invention, in addition to the PID control module 21, a rate control module 40 is operative, regardless of the position of the operating point in the compressor map, to respond to a rapid movement of the operating point toward surge by assuming control of the anti-surge valve 12 to open the anti-surge valve 12 and reduce the rate at which the operating point is approaching the surge line 73. In other words, the rate control module 40 is optimized to anticipate the likelihood of surge and to directly control the rate of approach. Thus, the rate control module 40 will respond to a high rate of approach by opening the anti-surge valve 12 even if the operating point is still relatively far away from the surge line 73.

In more detail, as shown in FIG. 2, the multiple module controller 20 has a control signal input 120 for receiving the control variable generated by the control variable calculator 16. The calculated control variable is indicative of the operating point of the dynamic compressor 11 in the compressor map. The control variable generally used in compressor surge control systems is defined as:

Control variable=(actual flow)$^2$/polytropic head.

It will be appreciated that each value of the control variable defined in this way corresponds to a parabolic curve in the compressor map. The position of the operating point of the compressor 11 in the map corresponding to a given value of the control variable can be uniquely determined if the actual flow rate is known.

The control variable is received by the PID control module 21 as its process variable. The control variable is further sent to a derivative module 22 which operates on the control variable to produce a rate signal having a magnitude indicative of the rate of approach of the operating point to the surge line 70 (FIG. 5). The rate signal is then sent to the rate control module 40 as its process variable. It will be appreciated that the rate signal can indicate a motion of the operating point either towards or away from the surge region. Unless otherwise specified, the term "rate of approach" used herein refer to the speed of movement of the operation point towards the surge region.

The PID control module 21 exerts closed loop control on the control variable to produce proportional, integral, and derivative terms and ultimately produces a first output signal for controlling the positioning of the anti-surge valve 12. The PID control module 21 is provided with a setpoint which corresponds to the surge control line 71 (FIG. 5), and the PID control module 21 acts to control the control variable when the value of the control variable is between the surge control line 71 and the surge line 70. In other words, the PID control module 21 acts to exert control action when the operating point of the dynamic compressor 11 assumes a position between the surge control line 71 and the surge line 70. The setpoint of the PID control module 21 is preferably selected to allow a chosen safety margin, typically between % 5 and 15%, between the surge line and the surge control line 71.

The rate control module 40 is also a form of closed loop PID controller having proportional, integral, and derivative terms. The rate control module 40 uses the rate signal as its process variable and generates a second output signal for controlling the opening of the anti-surge valve 12 when the rate of approach exceeds the setpoint of the rate control module 40. In response to a high rate of approach, caused, for example, by a sudden drop of the flow rate of the compressor 11, the rate control module 40 generates an output signal to open the anti-surge valve 12 to increase the flow so as to reduce the rate of approach toward the setpoint of the rate control module 40. The setpoint of the rate control module 40 also functions as a threshold point so that the rate control module 40 will not open the valve if the rate of approach is below the setpoint. In this way, unnecessary opening of the anti-surge valve 12 and interference to the downstream process 14 (FIG. 1) can be minimized.

As shown in FIG. 2, both the PID control module 21 and the rate control module 40 generate output signals for controlling the opening of the anti-surge valve 12. In the preferred embodiment, the control operations of the PID control module 21 and the rate control module 40 are coordinated using an output signal selector 25. The output signal selector 25 typically has a plurality of input signals. For purposes of the present invention, the only input signals of interest are those from the PID control module 21 and the rate control module 40. However, it will be appreciated that other controllers can provide output signals for the anti-surge valve 12, and those can include open loop controllers, load sharing controllers, and the like. Each of the input signals is normalized to correspond to a degree of valve opening of the anti-surge valve 12. One of the input signals is selected by the output signal selector 25 as the output signal of the multiple module controller 20 for controlling the anti-surge valve 12. Preferably the output signal selector 25 is a high signal selector in the sense that it selects the input signal that corresponds to the largest valve opening among the input signals.

In this way, the rate control module 40 and the PID control module can effectively perform their respective functions when the situation calls for either of them. For example, when the rate of approach exceeds the setpoint of the rate control module 40 but the operating point is still in the stable operation region, the rate control module 40 will be selected to open the valve 12 to prevent surge. On the other hand, if the operating point is close to the surge line but moving slowly, the PID control module 21 will be selected to control the valve opening to bring the operating point back to the surge control line. On another scenario, if the operation point is in the stable region and moving away from the surge region the rate control module will try to close the valve rapidly. Typically in such a case, the PID control module 21 will tend to close the valve at a slower pace. In such a case, the PID control module will have control of the valve and close the valve smoothly.

It has been appreciated that in the past that the rate of approach of the operating point to the surge control line 71 (FIG. 5) can be indicative of an impending surge. While the prior art as made attempts to use rate related information in surge control, it is believed that the control approaches have all been indirect, that is they have operated on another variable, such as moving the set point for the normal PID controller.

In controlling directly on rate in accordance with the present invention, a special purpose controller is used which takes account of the fact that the process signal for the controller is rate information, not position information. The controller, like a conventional closed loop controller, has a process signal and a setpoint which are compared to produce an error signal the magnitude of which drives the output to zero the error signal. However, when the process signal is a rate signal, and the controller is a PID, the ability to zero the error signal is lost unless special steps are taken.

In accordance with an important feature of the present invention, the rate control module 40 is provided with an integrator which provides an integral operation in addition to the proportional-integral-derivative terms commonly used in PID controllers. The rate control module 40 in the preferred embodiment is therefore an IPID controller. This integrator is provided so that the rate control module 40 reduces the error defined as the difference between its setpoint and its process variable, to zero. The integrator is necessary for that purpose because operating a conventional PID on a process variable which is a derivative of a field measured or calculated signal will provide action on the signal but will not have sufficient control response to reduce the error to zero in transient situations. For example, if the downstream process using the gas is shut down, the flow may drop continuously over a period of time, for example, thirty seconds. If a normal PID is used to control the rate, it will hold the valve opening at a constant level if the process input is equal to the setpoint. However, if the valve opening is held constant, the rate will pick up again, and the rate error will increase accordingly. The rate control module 40 is an IPID, is different from conventional PID controller in that it will continue to open the valve even if the process input equals the rate setpoint, i.e., if the error is zero. Such a response is due to the function of the additional integrator in the rate control module. In this way, the rate control module 40 is capable of reducing the rate error to zero. The effect of the integrator can be illustrated, using Laplace transformation notation as follows. The control variable, in the preferred embodiment, is defined as:

$$WS = \left( \frac{Q^2}{H} \right)_{Normalized}$$

where WS is the control variable, Q is the actual flow, and H is the polytropic head. The process variable for the rate control is defined as:

Process variable=(s) WS

The setpoint of the rate control is defined as

Setpoint=(s) $WS_{MAX}$.

The error term of the rate control is then

Error=Setpoint−Process Variable=s·($WS_{MAX}$−WS).

A conventional PID has a transfer function defined as:

$$\left[ P \cdot (sd+1) \cdot \left( \frac{1+I}{s} \right) \right].$$

The output of a conventional PID, when presented with the error, will have the following form:

$$\text{OUTPUT} = \left[ P \cdot (sd+1) \cdot \left( \frac{1+I}{s} \right) \right] \cdot ((s)(WS_{MAX} - WS))$$

$$\Rightarrow [P \cdot (sd+1) \cdot (1+I)] \cdot (WS_{MAX} - WS)$$

It can be seen that the "integral" term is missing in such an output. This is significant from a control standpoint since it is appreciated that the integral term is the term which ultimately brings the error signal to zero in a PID controller. Without an integral term, the PID controller cannot control the derivative of a process signal to a desired setpoint, i.e., the error cannot be reduced to zero.

According to the present invention, the rate controller is provided with an integrator so that its transfer function has the following form:

$$\text{GAIN} = \left[ \frac{P}{(s)} \cdot (sd+1) \cdot \left( \frac{I}{1+s} \right) \right]$$

When the rate control module operates on the error, the output has the form:

$$\text{OUTPUT} = \left[ \frac{P}{(s)} \cdot (sd+1) \cdot \left( \frac{I}{1+s} \right) \right] \cdot ((s) \, WS_{MAX} - WS)$$

$$\Rightarrow \left[ P \cdot (sd+1) \cdot \left( \frac{I}{1+s} \right) \right] \cdot (WS_{MAX} - WS)$$

It will be appreciated that the "integral" term, represented by I/(1+s), is now restored in the output. With the integrator, the rate control becomes an integral-proportional-integral-derivative (IPID) type controller, instead of a conventional PID type controller.

Figure 3:
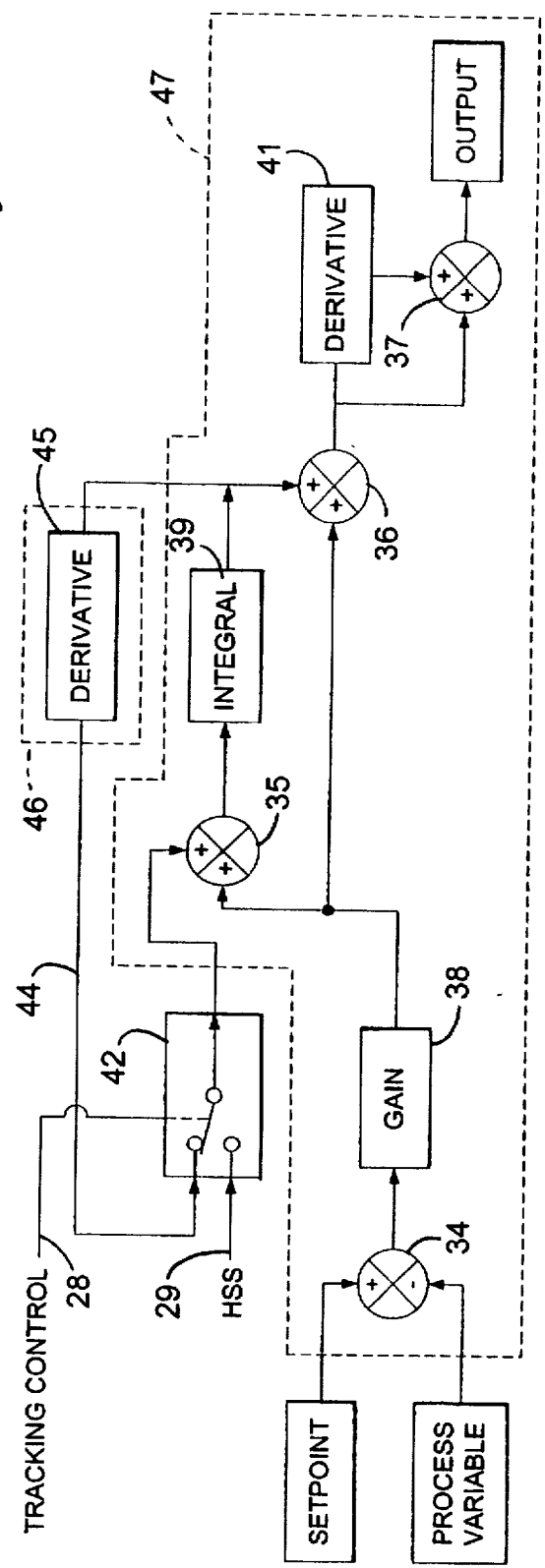
FIG. 3 is a schematic diagram of an embodiment of a rate control module for surge prevention having an integrator and a tracking element.

One embodiment of the rate control module 40 having an integrator is shown in FIG. 3. In this embodiment, the integrator 46 is implemented by adding a derivative operator 45 in a feedback path 44 to the PID portion 47 of the rate control module 40. Incorporating the derivative function of the derivative operator 45 in the feedback path 44 emulates an integral operation, which is in addition to the "integral" term in the PID portion 47.

As shown in FIG. 3, the PID portion 47 of the rate control module 40 includes a proportional operator 38, an integral operator 39, and a derivative operator 41. The output of the integral operator 39 is processed by the derivative operator 45, and the output of the derivative operator 45 is sent to the input of the integral operator 39 via the feedback path 44. This arrangement of feeding the output of the integral operator 39 back to its input via the derivative operator 45 emulates an integration function and provides the transfer function described above. Such an integration function allows the error of the rate control module 40 to be reduced to zero.

Referring in greater detail to FIG. 3, it will be seen that the input of the derivative operator 45 is taken at the output of the integral operator 39, and after the proportional operator 38, but before the derivative operator 41 in the PID module 47. Thus, the input to the derivative module 45 contains position related information. This is because the process variable, which is presented to the first summer 34 contains rate information which is presented to the integrator module 39 which integrates the rate information to produce position related information. The derivative operator 45 thereupon notes changes in the integrated rate information, and feeds that information back to the input of the integral operator 39 by way of summer 35. It will thus be appreciated that position related information is inserted into the PID function, and it is that information which allows the modified PID (IPID) of the rate control module 40 to zero the error signal.

It will be appreciated that the multiple module controller 20 allows transfer between modules and the controller, and if not properly implemented, can produce substantial discontinuities in the output signal applied to the anti-surge valve 12, when switching from module to module. In order to prevent that, in accordance with the present invention, the multiple module controller 40 is provided with a tracking function whereby the controller 40 determines which of the modules is the active module in control of the anti-surge valve 12, and which are inactive. All of the modules continue to monitor their input signals, and if steps were not taken, would produce output signals which differ from module to module. However, in accordance with the invention, the multiple module controller 40 is provided with tracking means for causing the inactive modules to track the output of the active module. To that end, the output of the output signal selector 25 is coupled to the tracking inputs of all the modules, and a tracking control line is provided for causing all of the inactive modules to track the output of the output signal selector 25.

In greater detail, either of the PID control module 21 or the rate control module 40 can have control over the anti-surge valve 12 as long as its output signal is larger than that of the other. In order to ensure smooth operation of the anti-surge valve 12 when the control is switched from the PID control module 21 to the rate control module 40 or vise versa, both the PID control module 21 and the rate control module 40 are provided with a tracking feature so that their output signals track the output signal of the output signal selector 25. As shown in FIG. 2, the output signal of the output signal selector 25 is fed back to the PID control module 21 and the rate control module 40 via output tracking lines 27 and 29. The output signal selector 25 also has tracking control lines 26 and 28 connected to the PID control module 21 and the rate control module 40, respectively. The tracking control lines 26 and 28 are used for transmitting tracking control signals indicating to each of the control modules 21 and 40 whether its output signal has been selected, i.e., whether it is currently in control of the anti-surge valve 12. The control module that is not in control will then adjust its output to track the output of the output signal selector 25.

FIG. 3 shows an example of the implementation of the tracking function of the rate control module 40 and the PID control module 21 described above. In this embodiment, a switch 42 is provided to select between the output signal of the output signal selector 25 on the tracking output line 43 and the output of the derivative operator 45. When the tracking control signal on the tracking control line 26 indicates that the rate control module 40 is not in control of the anti-surge valve 12 (FIG. 2), the switch 42 is controlled to connect the output signal of the output signal selector 25 on the tracking output line 43 to the summer 35 as the input to the integral operator 39. Providing the output of the output signal selector 25 to the summer 35 serves to preload the integral module 39, causing the output signal of the rate control module 40 to be driven to the same level as the output signal of the active PID control module 21. Thus, when it is desired to switch roles between active and inactive control modules 21 and 40, their outputs will be at the same level, providing a bumpless transfer. However, the control after the switch 40 will be in response to the process input and the PID functions associated with the now-active control module.

Adding the integrator function to the rate control module PID, and operating the rate control module 40 in parallel with the conventional PID module 21 provides a substantially enhanced control system. An output signal selector 25, coupled to the outputs of the respective control modules, selects the signal from the control module demanding the largest valve opening. Thus, the PID control module 21 is operative when the operating point is near the surge control line 71 (FIG. 5), and in that region, its output signal will normally control. However, with the operating point in any part of the compressor map, if the rate of approach of the operating point to the surge control line 71 exceeds the setpoint of the rate control module 40, the rate control module 40 will produce a high output signal and take control of the anti-surge valve 12.

In a simplified system, the set point for the rate control module 40 can be set at a fixed level corresponding to the maximum rate of approach acceptable in the compressor system. If the rate of approach exceeds that preset value, the rate control module 40 will produce an output signal. If its output is larger than the output signal produced by the PID control module 21, it will take charge of the anti-surge valve 12 and control its degree of opening.

As a further improvement on that system, however, means are provided for adjusting the setpoint of the rate control module 40 so as to render that module equally effective both near and away from the surge control line. To that end, and in accordance with a feature of the present invention, the setpoint of the rate control module 40 is adjusted according to the distance between the operating point of the compressor 11 and the surge line 70 (FIG. 5). Generally, the setpoint is set high when the operating point is far from the surge line 70, and is reduced when the operating point is closer to the surge line 70. In this way, higher flow rate fluctuation can occur without triggering the rate control module 40 into action when the flow is high, thereby avoiding unnecessary opening of the anti-surge valve 12. When the operating point is close to the surge line 70, however, even a low rate of approach may bring the operating point into the surge region. Accordingly, the setpoint of the rate control module 40 is reduced to provide higher sensitivity when the operating point is near the surge line 70. It is important to note that the setpoint of the rate control module 40 cannot be allowed to be reduced to zero; if it were, the rate control module 40 would keep the anti-surge valve 12 fully open regardless of the steady state condition of its process variable. This condition is avoided by setting a minimum non-zero lower limit for the output of the setpoint adjuster 24.

Figure 4:
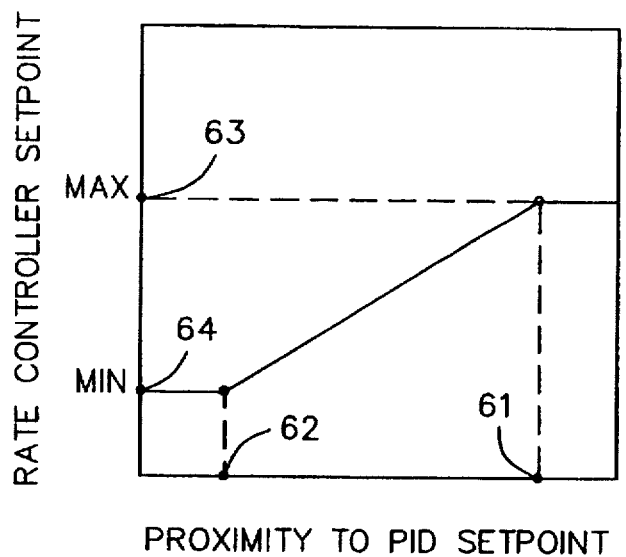
FIG. 4 shows a form of functional dependence of the setpoint of the rate control module on the proximity of the control variable to the setpoint of the PID control module.

In the preferred embodiment, the proximity of the control variable to the setpoint of the PID control module 21, i.e., the difference between the control variable and the surge control line setpoint of the PID control module 21, is used as an indicator of the proximity of the operating point of the dynamic compressor 11 to the surge line 70 for the purpose of adjusting the setpoint of the rate control module 40. An example of the functional dependence of the setpoint of the rate control module 40 on the proximity of the control variable to the setpoint of the PID control module 21 is illustrated in FIG. 4. As shown in FIG. 4, the setpoint of the rate control module 40 is variable between a maximum value and a minimum value. When the difference between the control variable and the setpoint of the PID control module 21 is above a value indicated by the point 61, the setpoint is fixed at a maximum value indicated by the point 63. When difference between the control variable and the setpoint of the PID control module 21 is below a value indicated by the point 62, the setpoint is fixed at a non-zero minimum value indicated by the point 64. When the difference between the control variable and the setpoint of the PID control module 21 is in the range between the two points 61 and 62, the setpoint of the rate control module 40 is linearly dependent on the difference. It will be appreciated that the method of setting the setpoint of the rate control module 40 as illustrated in FIG. 4 is only provided as an example, and other ways of selecting the value of the setpoint point can be used without departing from the scope and spirit of the present invention. In the preferred embodiment as shown in FIG. 2, the setpoint of the rate control module 40 is adjusted by a setpoint adjuster 24 which receives a signal from the control variable calculator 16 and determines the difference between the control variable and the setpoint of the PID control module 21.

In accordance with another feature of the present invention, the gain of the rate control module 40 is adjusted to regulate the dynamics of the rate control module 40 as the process conditions of the dynamic compressor 11 change. When the gas properties and the pressure and temperature at the inlet 10 (FIG. 1) and outlet 18 (FIG. 1) of the compressor 11 change, the flow through the anti-surge valve 12 can change significantly. As a result, the same amount of valve opening adjustment can have significantly different degrees of effect on the flow, depending on the process conditions of the dynamic compressor 11. In order to linearize the action of the rate control module 40 and to compensate for the process variations, the gain of the rate control module 40 is controlled according to the following gain function:

$$\text{Gain} = K \cdot F(P_s, P_d, T_d, SG),$$

where $P_s$, $P_d$, and $T_d$ are the suction pressure, discharge pressure, and discharge temperature of the dynamic compressor 11, respectively; SG is the specific gravity of the gas being processed by the compressor 11; K is a constant which is the typical gain for system response; F is a function that represents the normalized change in the relationship between the valve action and flow as the process conditions change, which depends on the flow characteristics of the anti-surge valve 12. By using a gain that is adjusted according to the response of the anti-surge valve 12 to the changes in process conditions, the dynamics of the rate control module 40 change appropriately as process conditions change. In this manner the rate control module 12 need be tuned at only one set of process conditions of the dynamic compressor 11 to generate a set of PID dynamics that is operational over the entire operating range of the dynamic compressor 11. In the embodiment of the multiple module controller 20 shown in FIG. 2, the gain of the rate control module 40 is set by a gain adjuster 18.

Figure 6:
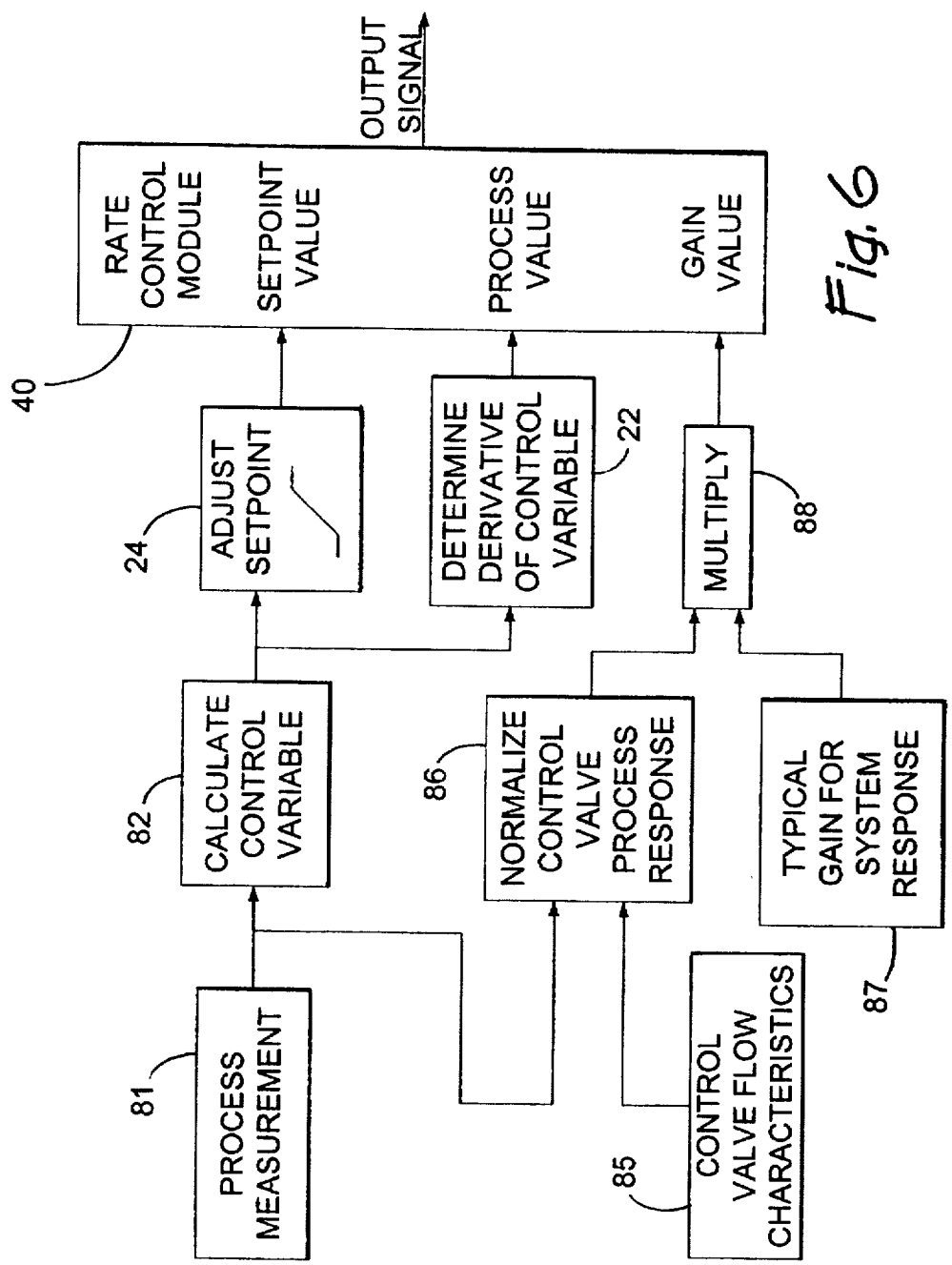
FIG. 6 is a block diagram illustrating the steps of establishing the gain, setpoint, and process variable of the rate control module.

FIG. 6 is a block diagram showing the interrelationship of the elements for establishing the values of the gain, setpoint and process variable of the rate control module 40 in the preferred embodiment of the invention. As shown in FIG. 6, a module 81 performs a process measurement to determine the operating conditions of the compressor 11. The result of the process measurement is used in a module 82 to calculate the control variable typically (flow)²/head. The control variable is then used in the setpoint adjuster 24 to establish the setpoint of the rate control module 40 as a function of the difference between the control variable and the setpoint of the PID control module 21. The process variable of the rate control module 40 is the derivative of the primary (flow)²/head process variable, and is determined in the derivative module 22. To determine the gain of the rate control module 40, the flow characteristics of the anti-surge valve 12 are determined in module 85. The valve flow characteristics and the result of the process measurement are then used to normalize the response of the anti-surge valve 12 as a function of the process conditions in module 86. A gain constant for system response is established using the output of the module 86. The gain constant and the normalized process response are multiplied in module 88 to control the value of the gain of the rate control module 40.

The interaction between the PID control module 21 and the rate control module 40 will now be illustrated by way of example. In this example, it is assumed that the output signal selector 25 (FIG. 2) receives input signals from only the PID control module 21 (FIG. 2) and the rate control module 40 (FIG. 2), so that the output signal of either of the two control modules 21 and 40 will be selected as the output signal of the output signal selector 25 for controlling the valve opening of the anti-surge valve 12 (FIG. 2). It is assumed that the setpoint for the PID control module 21 is normalized to one hundred (100.0). If the control variable has a value smaller or equal to 100.0, the PID control module 21 acts to open the anti-surge valve 12 (FIG. 2). If the control variable is larger than 100.0, the PID control module 21 acts to close the anti-surge valve 21.

The rate control module 40, on the other hand, acts on the rate at which the control variable approaches the setpoint of the PID control module 21. In this example, the multiple module controller 20 (FIG. 2) is assumed to have a loop response time of ten (10.0) seconds. The setpoint of the rate control module 40 is set using the following equation:

$$S_R = \frac{(CV - S_{PID})}{10.0}$$

for a control variable value within the range of 105.0 to 200.0, where $S_R$ is the setpoint of the rate control module 40, $S_{PID}$ is the setpoint of the PID control module 21, and CV is the control variable. The setpoint is set to a maximum of 10.0 if the control variable exceeds 200.0, and is set to a minimum of 0.5 if the control variable falls below 105.0.

For purposes of illustration, the compressor map of the dynamic compressor 11 (FIG. 1) controlled by the multiple module controller 20 is shown in FIG. 5. The vertical axis of compressor map is the polytropic head, and the horizontal axis is the actual flow of the dynamic compressor 11. The surge line 70 divides the surge region 73 and the stable operation region 74. A surge control line 71, which corresponds to the selected setpoint of the PID control module 21, is disposed in the stable operation region 74 at a selected safety margin from the surge line 70. In this example, the surge line 70 is assumed to correspond to a control variable value of 90.0.

In the compressor map shown in FIG. 5, it is assumed that the points A, B, C, D, and E correspond to the control variable values of 150.0, 140.0, 130.0, 95.0, and 100.0, respectively. Assume that initially the operating point of the dynamic compressor 11 is at point A. At point A, the setpoint of the rate control module 40 is 5.0. Now assume that the operating point moves from point A to point C, at a rate of 4.0 per second. Initially the rate control module 40 would not respond to such a movement because the rate is lower than its setpoint. However, once the operating point passes point B, the control variable drops below 140.0, and the setpoint of the rate control module 40 drops below 4.0. The rate control module 40 then becomes active and generates an output signal to open the anti-surge valve 12 because its setpoint has become lower than the reduction rate of the control variable. At the same time, the PID control module 21 produces an output signal to close the anti-surge valve 12 because the control variable is still higher than the setpoint of the PID control module 21. In this situation, the output signal of the rate control module 40 is selected by the output signal selector 25 and the rate control module 40 begins to open the anti-surge valve 12 to control the reduction rate of the control variable. It will be appreciated that due to the mathematical correspondence between the control variable and the position of the operating point on the compressor map, controlling the rate of change of the control variable is conceptually equivalent to controlling the rate of approach of the operating point to either the surge control line 71 or the surge line 70.

When the operating point reaches point C, the setpoint of the rate control module 40 is reduced to 3.0. If the operating point stops at point C so that the control variable is stable at 130.0, then the rate control module 40 will start to close the anti-surge valve 12. If, however, the operating point continues to move from point C to point D and that the control variable drops at a rate higher than the setpoint of the rate control module 40, the rate control module 40 will continue to open the anti-surge valve 12 in order to control the reduction rate of the control variable.

Once the operating point passes the point E on the surge control line 71, the control variable is reduced below 100.0, the setpoint of the PID control module 21. The PID control module 21 then becomes active and generates an output signal to open the anti-surge valve 12 in order to control the control variable. The output signal of the PID control module 21 is compared to the output signal of the rate control module 40, and the larger of the two output signals will be selected to control the anti-surge valve 12. If the operating point stops at point E so that it is no longer approaching the surge line 70, the rate of change of the control variable is below the setpoint of the rate control module 40, which is 0.5 at point E. The rate control module 40 then generates an output signal to close the anti-surge valve 12. At the same time, the PID control module 21 generates an output signal to open the anti-surge valve 12 in order to move the control variable toward its setpoint of 100.0. In this situation, the PID control module 21 will have control of the anti-surge valve 12.

The switching of control of the anti-surge valve 12 between the PID control module 21 and the rate control module 40 depends on how fast the control variable changes, the value of the control variable, and the tuning of the rate control module 40 and the PID control module 21, as well as the system dynamics. If the operating point is moving slowly but is left of the surge control line 71, then the PID control module 21 is likely to gain control of the anti-surge valve 12. On the other hand, if the operating point is very close to the surge control line 71 but is moving toward the surge line 70 at a sufficiently high rate, then the rate control module 40 is likely to gain control of the anti-surge valve 12.

Figure 7:
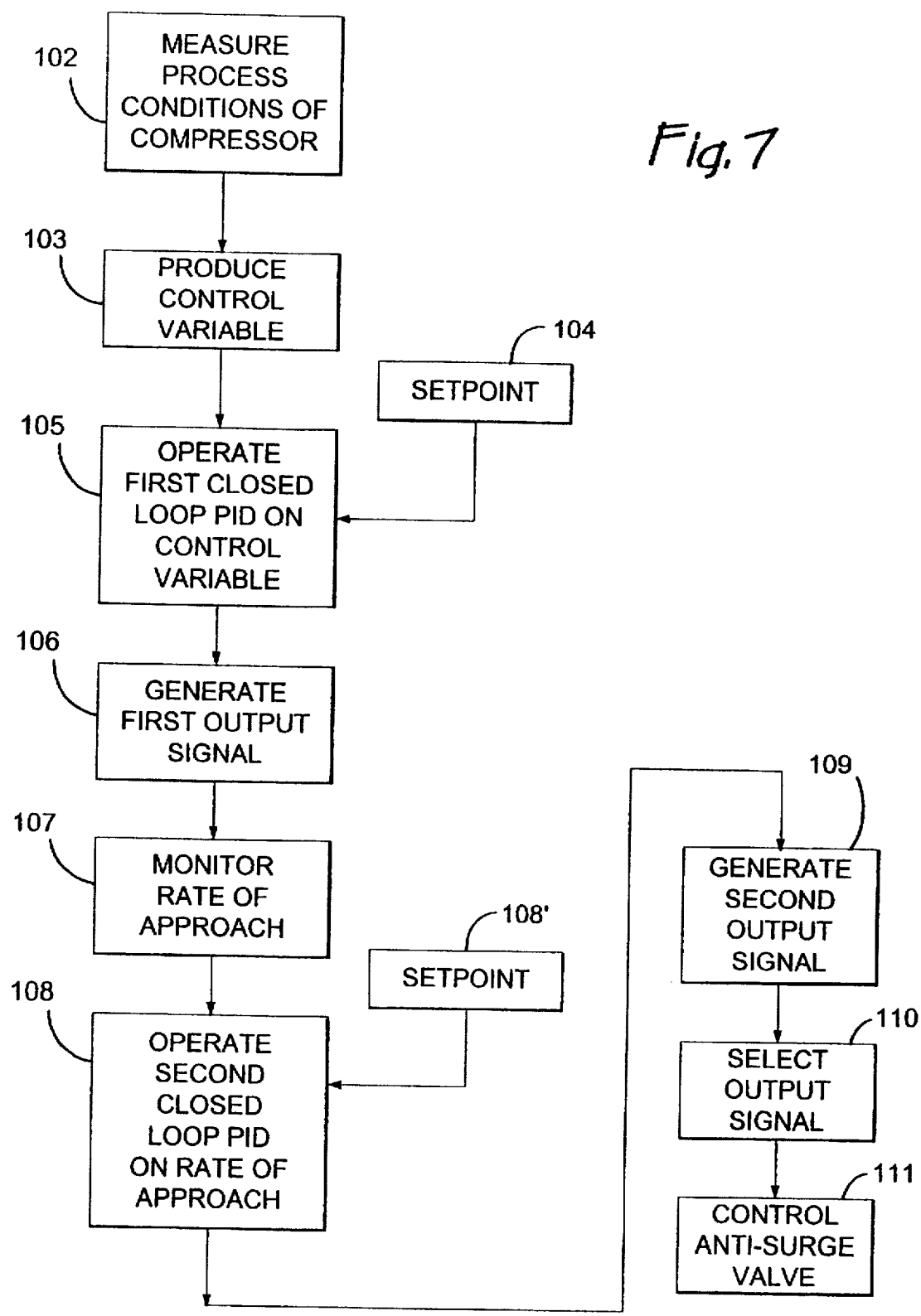
FIG. 7 is a block diagram useful in understanding the method according to the teaching of the present invention for preventing surge in a dynamic compressor.

The method of the present invention for preventing surge in the dynamic compressor 11 (FIG. 1) will now be described in conjunction with FIG. 7. In order to control the flow of the dynamic compressor 11 to prevent surge, an anti-surge valve 12 (FIG. 1) is connected to the dynamic compressor 11. The valve opening of the anti-surge valve 12 is controllably adjusted to bypass the output flow around the dynamic compressor 11 to increase the flow through the dynamic compressor 11. In order to properly control the opening of the anti-surge valve 12, the process conditions, such as flow, pressure, and temperature, etc., of the compressor 11 are measured (step 102). The result of the process measurement is used to produce a control variable indicative of the operating point of the compressor 11 in its compressor map (step 103).

A step 105 exercises closed loop PID control on the control variable 103. The step has a setpoint, schematically indicated at 104, which determines the point to which the process variable is to be controlled. In the preferred practice of the invention, the setpoint 104 is the surge control line 71 (FIG. 5), and the step 105 exerts control of the anti-surge valve primarily in the region between the surge control line 71 and the surge line 70 (FIG. 5). In doing so, the PID control function is used to generate a first output signal (step 106) which controls the output of the anti-surge valve 12.

In order to anticipate the risk of surge, the rate of approach of the operating point towards surge is monitored (step 107). Preferably, the same signal which serves as the process input for the control operation in step 105, is used as an input to step 107, and step 107 simply produces the time derivative of the process signal. That time derivative serves as an indicator of the rate of approach of the compressor operating point to the surge line 70 or the surge control line 71.

In accordance with the teaching of the present invention, the rate of approach is directly controlled by performing a second closed loop PID operation on the rate of approach (step 108). The PID of step 108 also has a setpoint, identified schematically at 108', which is used with the rate signal as a process variable to produce an error signal, and to generate an output signal from the PID of step 108 capable of controlling the anti-surge valve 21. In the simplest implementation, the setpoint 108' is simply a fixed level indicating the maximum allowable rate of approach of the operating point to the surge control line. Alternatively, the setpoint adjusting module 24 of FIG. 2 is preferably utilized.

The step 108 utilizes a PID control in combination with an integrator as described in detail above to produce an output signal capable of reducing the error between the setpoint and the process variable to zero. The output signal is a measure of the degree of opening of the anti-surge valve demanded by the rate control PID, and the generation of that output signal is illustrated by the block 109. A selection between first and second output signals is then made (step 110), and the output signal corresponding to larger opening of the anti-surge valve 12 is selected to control the valve opening of the anti-surge valve 12 (step 111). Thus, if the first output signal is selected, the first PID operation of step 105 will have control of the anti-surge valve 12 to control the control variable. On the other hand, in the event of high rate of approach of the operating point to the surge control line 71, the second PID operation of step 108 will produce a larger output signal than that of the first PID control. In such a case, the second PID operation takes control of the anti-surge valve 12 and opens it to control the rate of approach.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A control system for avoiding surge in a dynamic compressor, the compressor having a variable operating point definable on a compressor map which includes a stable region, a surge region, a surge line separating the two regions, and a surge control line in the stable region near but displaced from the surge line, the control system comprising in combination:
- a selectively responsive anti-surge valve coupled to the compressor for controllably increasing compressor flow;
- a multiple module controller for receiving a control variable indicative of the operating point of the compressor and producing a control signal for controlling the anti-surge valve; the multiple module controller including;
  - a PID control module responsive to the control variable for producing a first output signal exerting control action on the operating point of the compressor between the surge control line and the surge line;
  - a closed loop rate control module responsive to a signal indicative of the rate of approach of the operating point to the surge control line for producing a second output signal having a magnitude which exerts control action on the operating point of the compressor to limit the rate of approach; and,
  - an output signal selector for selectively coupling the first or second output signal as the control signal to the anti-surge valve.

2. A control system as defined in claim 1 in which the multiple module controller includes a derivative module responsive to the control variable for producing a rate signal indicative of the rate of approach of the operating point to the surge control line, and means coupling the rate signal to the rate control module.

3. A control system as defined in claim 2 wherein the PID control module is a closed loop controller having the control variable as a process input and having a set point corresponding to the surge control line.

4. A control system as defined in claim 3 wherein the rate control module includes a closed loop PID controller having the rate signal as a process input and a set point corresponding to a maximum acceptable rate of approach of the operating point to the surge control line.

5. A control system as defined in claim 4, wherein the rate control module has a supplemental integrator for controllably increasing output with zero rate error, thereby to assist in zeroing a rate error signal between the process input and setpoint.

6. A control system as defined in claim 5, wherein the integrator of the rate control module includes a derivative operator in a feedback path of the closed loop PID controller.

7. A control system as defined in claim 4 in which the output signal selector comprises a high signal selector coupled to the PID control module and the rate control module, and adapted to pass as the control signal to the anti-surge valve, the output signal demanding the largest anti-surge valve opening.

8. A control system as defined in claim 1, wherein the rate control module has a setpoint adjuster for adjusting the setpoint of the rate control module according to the proximity of the control variable to the setpoint of the PID control module.

9. A control system as defined in 8, wherein the setpoint adjuster reduces the setpoint of the rate control module when a difference between the control variable and the setpoint of the PID control module decreases.

10. A control system as defined in claim 8, wherein the setpoint adjuster produces a non-zero minimum when the difference between the control variable and the setpoint of the PID module is smaller than a selected value.

11. A control system as defined in claim 1, wherein each of the first and second output signals correspond to a degree of valve opening of the anti-surge valve, and wherein the output signal selector is a high signal selector for selecting the output signal corresponding to the largest valve opening.

12. A control system as defined in claim 1, wherein each of the PID control module and the rate control module have an output tracking line for receiving the control signal from the output signal selector, and a tracking control line indicating which of said modules is in control of the anti-surge valve, whereby the module not in control of the anti-surge valve tracks the control signal.

13. A control system as defined in claim 1, wherein the rate control module has a gain adjuster for adjusting a gain of the rate control module in dependance on process conditions of the dynamic compressor.

14. A control system for avoiding surge in a dynamic compressor, the compressor having a variable operating point definable on a compressor map which includes a stable region, a surge region, a surge line separating said regions, and a surge control line in the stable region near but displaced from the surge line, the control system comprising, in combination:
- an anti-surge valve coupled to the compressor and responsive to an electrical control signal for controllably increasing compressor flow;
- a multiple module controller responsive to a control variable indicative of operating point of the compressor for producing said control signal, the multiple module controller including:
  - a closed loop PID control module responsive to the control variable for exerting control action on the operating point of the compressor when said operating point is between the surge control line and the surge line;
  - a closed loop rate control module responsive to a signal indicative of the rate of approach of the operating point to the surge control line for exerting control action on the operating point of the compressor anywhere in the compressor map when the rate of approach exceeds a given level, and
  - selector means for passing control of the anti-surge valve between the PID control module and the rate control module.

15. A control system according to claim 14 wherein the selector means comprises a high signal selector coupled to the PID and rate control modules for outputting, as the control signal, the output of the module which demands the largest anti-surge valve opening.

16. A control system according to claim 14 in which the rate control module is a PID controller having a process input responsive to rate of approach of the operating point to the surge control line, and a setpoint corresponding to a maximum acceptable rate of approach.

17. A control system according to claim 16 including a setpoint adjuster for establishing the setpoint for the rate control module, and altering the maximum acceptable rate of approach in accordance with the distance between the compressor operating point and the surge control line.

18. A control system according to claim 16 in which the PID controller of the rate control module is modified to include an integrator term integrating the rate of approach process input to allow the rate controller to zero a rate error signal determined between the process input and the set point.

19. A method for preventing surge in a dynamic compressor, the dynamic compressor having a variable operating point definable on a compressor map which includes a surge region and a stable region separated by a surge line, and a surge control line in the stable region displaced from the surge line, the method comprising the steps of:

providing an anti-surge valve having an adjustable opening for increasing flow through the dynamic compressor;

sensing process conditions in the dynamic compressor to produce a control variable indicative of the operating point of the dynamic compressor;

operating a first closed loop PID to generate a first output signal for controlling the anti-surge valve to control the operating point about the surge control line;

monitoring a rate of approach of the operating point to the surge control line;

operating a second closed loop PID to generate a second output signal for controlling the anti-surge valve to control the rate of approach;

selecting among the first and second output signals as a control signal; and adjusting the opening of the anti-surge valve according to the control signal.

20. A method as defined in claim 19, including the step of adjusting a setpoint of the second closed loop PID according to the difference between the control variable and the surge control line.

21. A method as defined in claim 20, wherein the step of adjusting the setpoint reduces the setpoint of the second closed loop PID when the difference between the control variable and the surge control line decreases.

22. A method as defined in claim 19, including the step of adjusting the gain of the second closed loop PID according to process conditions of the dynamic compressor.

23. A method as defined in claim 19, wherein the step of selecting output signal selects the larger of the first and second output signals.

24. A method as defined in claim 19, wherein the step of operating the second closed loop PID includes determining an integral in conjunction with a PID process to achieve zero error.

25. A method as defined in claim 19, in which the step of selecting defines an active PID whose output signal is the control signal and an inactive PID whose output signal is not selected, and further including the step of tracking the non-selected PID to match its output signal to the control signal for transfer between PIDs.

26. A method for preventing surge in a dynamic compressor, the dynamic compressor having a variable operating point definable on a compressor map which includes a surge region and a stable operation region separated by a surge line, and a surge control line in the stable region displaced from the surge line, the method comprising the steps of:

providing an anti-surge valve having an adjustable opening for increasing flow through the dynamic compressor;

sensing process conditions of the dynamic compressor to produce a control variable indicative of the operating point of the dynamic compressor;

performing a closed loop PID control on the anti-surge valve using the control variable as a process variable and the surge control line as a setpoint;

monitoring a rate of approach of the operating point toward the surge control line; and in the event of high rate of approach, taking control of the anti-surge valve by performing a closed loop PID control using the rate of approach as a process variable.

27. A method as defined in claim 26, wherein the step of performing the closed loop PID on the rate of approach includes performing an integral operation in conjunction with a PID operation to achieve zero error.

* * * * *